United States Patent [19]  
Wieder et al.

[11] 4,316,820  
[45] Feb. 23, 1982

[54] CATALYST, PREPARATION THEREOF AND USE THEREOF IN THE PREPARATION OF TELOMERIC POLYBUTADIENE HOMO- OR CO-POLYMERS

[75] Inventors: Wolfgang Wieder, Leverkusen; Josef Witte, Cologne, both of Fed. Rep. of Germany

[73] Assignee: Bayer AG, Fed. Rep. of Germany

[21] Appl. No.: 120,626

[22] Filed: Feb. 11, 1980

[30] Foreign Application Priority Data

Feb. 15, 1979 [DE] Fed. Rep. of Germany ....... 2905763

[51] Int. Cl.$^3$ .............................................. B01J 31/12
[52] U.S. Cl. ........................... 252/431 N; 252/431 L; 585/521
[58] Field of Search ........................ 252/431 N, 431 L

[56] References Cited

U.S. PATENT DOCUMENTS 3,285,894 11/1966 Lim et al. ................... 252/431 L X
3,356,754 12/1967 Wofford ..................... 252/431 L X
3,632,658 1/1972 Halasa ........................ 252/431 L X
3,751,501 8/1973 Kamienski et al. ......... 252/431 L X

*Primary Examiner*—Patrick Garvin
*Attorney, Agent, or Firm*—Connolly and Hutz

[57] ABSTRACT

A catalyst comprising:
(a) an organometallic compound corresponding to the following general formula: RMe wherein R represents a saturated aliphatic or aromatic hydrocarbon radical having from 2 to 8 carbon atoms; and Me represents an alkali metal;
(b) a compound corresponding to the following general formula: R'OMe' wherein R' represents a saturated aliphatic or aromatic hydrocarbon radical having from 2 to 8 carbon atoms; and Me' represents an alkali metal; and
(c) a tertiary aliphatic triamine.

A process for the preparation of said catalyst wherein components (a), (b) and (c) are dissolved, in any order, in an aliphatic or aromatic hydrocarbon and reacted at temperatures of from 0° to 100° C., and its use in the preparation of telomeric polybutadiene homo- or co-polymers.

4 Claims, No Drawings

CATALYST, PREPARATION THEREOF AND USE THEREOF IN THE PREPARATION OF TELOMERIC POLYBUTADIENE HOMO- OR CO-POLYMERS The present invention relates to a catalyst comprising an organometallic compound, an alkali metal alkoxide and a tertiary triamine, to the preparation thereof by reacting the above components and to the use thereof in the polymerisation of butadiene in the presence of telogens to give fluid telomeric butadiene homo- or co-polymers.

It is known to convert butadiene to low molecular weight telomers in the presence of transfer reagents (telogens) using various catalysts. Alkyl aromatic substances, for example toluene, are used as telogens.

U.S. Pat. No. 3,356,754 describes a catalyst which consists of butyl lithium and potassium tertiarybutoxide. U.S. Pat. No. 3,751,501 mentions as an additional catalyst component an amine, for example tetramethyl ethylenediamine (TMEDA). U.S. Pat. No. 3,678,121 discloses a catalyst complex of a polylithium-hydrocarbon and TMEDA. DE-OS No. 2,148,148 describes a catalyst consisting of, for example, butyl lithium, nickel acetylacetoneate, potassium tertiarybutoxide and tetramethyl ethylenediamine.

According to U.S. Pat. No. 3,356,754, the monomer/telogen solution is prepared first and the catalyst is added subsequently. This has various disadvantages:

The molecular weight control is poor. In order to obtain fluid products, the reaction has to be carried out in dilute solution (about 11 weight percent). However, small solvent amounts are required; on the other hand, according to the process of U.S. Pat. No. 3,356,754, control of the reaction is difficult, so that it is critical particularly in the case of larger preparations to raise the monomer concentration. As was shown in U.S. Pat. No. 3,751,501, the catalyst system of U.S. Pat. No. 3,356,754 has only an unsatisfactory telomerisation activity.

The method which is described in the above-mentioned U.S. Pat. No. 3,751,501, U.S. Pat. No. 3,678,121 and DE-OS No. 2,148,148 as being advantageous, involves introducing the telogen with the various catalyst systems and introducing butadiene at a certain temperature into the reaction mixture. The catalysts which were used have the following disadvantages:-

Each of the catalysts described in the above-mentioned references yields a product having a microstructure typical for the catalyst. Thus, a polybutadiene oil, which was produced according to U.S. Pat. No. 3,678,121, contains a large amount of saturated cyclic structures and a large amount of 1,2-structures. A catalyst according to DE-OS No. 2,148,148 produces oils having a cis-1,4-content >20% and a 1,2-content of >40%. Typical microstructures according to U.S. Pat. No. 3,751,501 contain >45% 1,2- and <20% 1,4-cis-structures. It is not possible using the above-mentioned catalysts to obtain varied microstructures of the telomers.

In an advantageous process for the preparation of low molecular weight polybutadiene telomers, after the reaction has finished, as little solvent as possible should be present and the finished product should contain only small amounts of residual catalyst.

To meet these requirements, the most active possible catalyst system should be used.

Thus, it is an object of the present invention to provide a catalyst system which has particular advantages as against those systems known hitherto.

The present invention therefore relates to a catalyst comprising:
 (a) an organometallic compound corresponding to the following general formula: RMe, wherein R represents saturated aliphatic or aromatic hydrocarbon radical having from 2 to 8 carbon atoms; and Me represents an alkali metal;
 (b) a compound corresponding to the following general formula: R' OMe' wherein R' represents a saturated aliphatic or aromatic hydrocarbon radical having from 2 to 8 carbon atoms; and Me' represents an alkali metal; and
 (c) a tertiary aliphatic triamine.

The present invention also relates to the preparation of the above catalysts, which is characterised in that the components (a), (b) and (c) are dissolved, in any order, in an aliphatic or aromatic hydrocarbon solvent and reacted at temperatures of from 0° to 100° C.

The present invention further relates to the use of the present catalyst in the preparation in the presence of telogens of telomeric polybutadiene homo- or copolymers.

The use of the catalyst according to the present invention makes it possible to produce telomeric fluid polybutadiene oils in large amounts, the polybutadiene oil having a controlled molecular weight and a variable 1,2-(vinyl)-content. The molecular weight ($M_n$) is preferably from 500 to 3000, and the 1,2-(vinyl)-content from 35 to 45%. The aliphatic tertiary triamine causes a decrease of the molecular weight of the telomer oil, in contrast to TMEDA, without allowing the 1,2-(vinyl)-content of the product to increase markedly. The molecular weight control itself is clearly improved, compared to using TMEDA.

The radicals R and R' in the above formulae in the definitions of the catalyst components (a) and (b) preferably independently represent ethyl, propyl, n-butyl, sec.-butyl, t-butyl, pentyl, (cyclo-)hexyl, heptyl, octyl, phenyl, benzyl or tolyl, in the case of R, n-butyl is particularly preferred; in the case of R' t-butyl is particularly preferred. Me and Me' independently represents Li, Na, K, Rb or Cs; Me preferably represents Li and Me' preferably represents K.

Pentamethyl diethylenetriamine (PMDTA) is particularly preferred as the tertiary aliphatic triamine.

The molar ratio of components (a) and (b) is preferably from 0.1:1 to 50:1, more preferably from 1:1 to 20:1. The molar ratio of components (a) and (c) is preferably from 0.1:1 to 10:1, more preferably from 0.5:1 to 5:1.

As a solvent in the preparation of the catalyst, for example, (cyclo)-hexane, heptane, benzene, toluene or xylene may be used, toluene being preferred. It is to be noted that some of the above-mentioned solvents are also telogens. The starting components (a), (b) and (c) are added in the same ratios as they are present in the end product.

A preferred embodiment of the preparation involves pre-forming the catalyst in the presence of telogens. By "pre-forming" is meant the reaction of the catalyst components in a solvent, preferably the telogen used in the absence of monomers.

As described above, the present catalyst may be used in the preparation of polybutadiene telomers. It is advantageous to add it is such a way that component (a) is present in quantities of from 0.1 to 20 millimols, preferably from 0.5 to 5 millimols, per 100 g of the monomer. The polymerisation process is advantageously carried out in such a way that the telogen, optionally in the mixture with inert solvents, such as (cyclo) aliphatic hydrocarbons, for example (cyclo)-hexane, or benzene, is introduced together with the catalyst, and the monomers are added at the required reaction temperature. The reaction temperature is, for example, from 40° to 150° C., preferably from 50° to 100° C.

The following are particularly useful as telogens: alkylaromatic hydrocarbons, such as toluene, xylene, mesitylene, (iso-) durene, ethylbenzene, isopropyl benzene, diisopropylbenzene, triisopropylbenzene, pentamethylbenzene and hexamethylbenzene, toluene being preferred.

The weight of telogen used may be from 0.05 to 5, preferably from 0.07 to 1, times the amount of the monomer.

As monomers, all monomers, except butadiene, which may be copolymerised with butadiene are considered, such as isoprene, α-methylstyrene, piperylene, ethylene and styrene.

At the end of the telomerisation reaction, the catalyst is inactivated, preferably by the addition of a proton active substance, for example water, alcohols or carboxylic acids. The catalyst residues may be removed from the product by, for example, extraction, however, a particular advantage of the present catalyst resides in the fact that such a measure is unnecessary in many cases. Excess telogen or solvent is separated from the product, preferably by evaporation and because of the high activity of the catalyst, usually at only a small cost.

EXAMPLES

All the experiments were carried out using dried solvents and reagents under a nitrogen atmosphere. The microstructure of the polybutadiene oils was determined by IR-spectroscopy, the molecular weight by way of steam vapour osmometric method. Butyl lithium was used as 2.1-molar solution in n-hexane. The bases TMEDA and PMDTA which were used were dried over calcium hydride and were distilled.

EXAMPLE 1

A series of experiments was carried out, from which emerges the improved molecular weight control using PMDTA as against TMEDA. At the same time, it is to be recognised that by using PMDTA, the 1,2-content of the telomer oils is clearly lower than by using TMEDA.

(a) 200 ml toluene, 5 mmol BuLi and 0.5 mmol K-t-butoxide were introduced into a 1 liter flask at 60° C. Gaseous butadiene was introduced into the well stirred mixture at about 150 g/h. After 2 hours it was inactivated using formic acid and the volatile matter was removed under vacuum.

$M_n$ 6500; 1,2-fractions 36.7%.

(b) to (g) The following experiments were carried out in a manner analogous to (a), but using increasing amounts of TMEDA or PMDTA. See following Table for results.

|     | mmol TMEDA | mmol PMDTA | 1,2-fractions % | $M_n$ |
| --- | --- | --- | --- | --- |
| (a) | — | — | 36.7 | 6500 |
| (b) | 1.0 | — | 54.2 | 3200 |
| (c) | — | 1.0 | 54.9 | 2200 |
| (d) | 3.0 | — | 59.9 | 2400 |
| (e) | — | 3.0 | 46.1 | 830 |
| (f) | 5.0 | — | 61.9 | 2200 |
| (g) | — | 5.0 | 45.2 | 790 |

1(h) 200 ml toluene, 5 mmol BuLi and 0.25 mmol K-t-butoxide were introduced into a 1 liter flask at 90° C. Gaseous butadiene was introduced into the stirred mixture at about 150 g/h. After 2 hours it was inactivated using formic acid, the volatile matter was removed under vacuum. A product resulted having molecular weight Mn 3900, 1,2-content 21.8%.

(i) to (o) The following Examples were carried out similarly to Example 1(h) using the stated quantities of TMEDA. See following table for results.

|     | mmol TMEDA | mmol PMDTA | 1,2-fractions % | $M_n$ |
| --- | --- | --- | --- | --- |
| (h) | — | — | 21.8 | 3900 |
| (i) | 1.0 | — | 44.4 | 1700 |
| (k) | — | 1.0 | 43.5 | 1400 |
| (l) | 3.0 | — | 54.0 | 1260 |
| (m) | — | 3.0 | 37.6 | 680 |
| (n) | 5.0 | — | 55.5 | 1210 |
| (o) | — | 5.0 | 37.2 | 610 |

EXAMPLE 2

(a) Gaseous butadiene was introduced at 500 g/h into a mixture of 50 ml toluene, 5.0 mmol BuLi and 220 mg potassium-t-butoxide at a temperature of 90° C. The procedure as in Example 1 produced an oil having a molecular weight of 2500 and 44.0% 1,2-fractions.

(b) As (a), except additionally 1.0 mmol PMDTA was added. Molecular weight 1300; 1,2-content 38.8%.

(c) Example was carried out as under (b), except that 5.0 mmol PMDTA (instead of 1.0 mmol) was added to the mixture. An oil resulted having a molecular weight of 1200 and 38.3% vinyl units.

EXAMPLE 3

(a) Gaseous butadiene was introduced at a rate of about 150 g/h into a mixture of 50 ml toluene, 5.0 mmol BuLi and 110 mg potassium-t-butoxide at a temperature of 90° C. Following the method of Example 1(a), an oil was isolated having a molecular weight of 2000 and 39.8% 1,2-butadiene-fractions.

(b) As (a), except that the catalyst additionally contained 2.5 mmol PMDTA; molecular weight 1200, 1,2-content 39.6%.

EXAMPLE 4

295 ml toluene was introduced into a dry 6 liter autoclave under nitrogen and the temperature raised to 70° C. A catalyst was pre-formed in 50 ml toluene in a separate container for 2 hours at room temperature from the following:

14.72 mmol BuLi, 8.85 mmol PMDTA and 5.9 mmol K-t-butoxide.

After the pre-formed catalyst mixture had been introduced into the autoclave, fluid butadiene was pumped in at about 0.84 l/h. After from 5 to 6 hours, 2.6 kg butadiene was also pumped in. After cooling, the preparation was inactivated using 10 ml 85% formic acid and volatile matter was removed using a thin film evaporator. Yield 2450 g (correspondingly 166 kg oil/BuLi equivalent) of a yellowish oil of molecular weight 1600 having a 1,2-content of 38.3%.

EXAMPLE 5

A catalyst mixture of 350 ml toluene, 123 mmol BuLi, 82.6 mmol PMDTA and 40 mmol potassium-t-butoxide was pre-formed for 2 hours at room temperature. This mixture was introduced into a dry 40 liter autoclave, which has been purged with nitrogen, the autoclave contained 1715 ml toluene and was heated to 70° C.

Within about 20 hours, fluid butadiene was also pumped in at about 1.47 l/h until 18.2 kg were introduced. After cooling, the catalyst was deactivated using 85% formic acid and the excess toluene was removed using a thin film evaporator. Yield 17.4 kg of a yellowish oil (correspondingly 141 kg oil/BuLi equivalent) having a molecular weight of 1500 and 39.2% 1,2-fractions.

We claim:

1. A catalyst comprising the reaction product of
   (a) an organometallic compound of the formula RLi wherein R is a saturated aliphatic or aromatic hydrocarbon radical having from 2 to 8 carbon atoms;
   (b) a compound of the formula R'OMe' wherein R' is a saturated aliphatic or aromatic hydrocarbon radical having from 2 to 8 carbon atoms and Me' is alkali metal and
   (c) pentamethyldiethylenetriamine, the molar ratio of (a) to (b) being from 0.1:1 to 50:1 and the molar ratio of (a) to (c) being from 0.1:1 to 10:1.

2. The catalyst of claim 1 wherein the molar ratio of (a) to (b) is from 1:1 to 20:1 and the molar ratio of (a) to (c) is from 0.5:1 to 5:1.

3. A process for preparing a catalyst of claim 1 wherein components (a), (b) and (c) are dissolved in any order in an aliphatic or aromatic hydrocarbon solvent and reacted at a temperature of from 0° to 100° C.

4. The process of claim 3 wherein components (a), (b) and (c) are reacted in the presence of a telogen.

* * * * *